(12) United States Patent
Keller et al.

(10) Patent No.: US 11,179,585 B2
(45) Date of Patent: Nov. 23, 2021

(54) SAFETY POST

(71) Applicant: Peri AG, Weissenhorn (DE)

(72) Inventors: Martin Keller, Heilbronn (DE); Klaus Bornack, Mundelsheim (DE)

(73) Assignee: Peri AG, Weissenhorn (DE)

( * ) Notice: Subject to any disclaimer, the term of this patent is extended or adjusted under 35 U.S.C. 154(b) by 0 days.

(21) Appl. No.: 16/092,207

(22) PCT Filed: Apr. 7, 2017

(86) PCT No.: PCT/EP2017/058464
§ 371 (c)(1),
(2) Date: Oct. 8, 2018

(87) PCT Pub. No.: WO2017/174808
PCT Pub. Date: Oct. 12, 2017

(65) Prior Publication Data
US 2020/0330802 A1    Oct. 22, 2020

(30) Foreign Application Priority Data

Apr. 8, 2016  (DE) ...................... 10 2016 106 533.1

(51) Int. Cl.
*A62B 35/00* (2006.01)
*E04G 21/32* (2006.01)
*F16B 2/10* (2006.01)

(52) U.S. Cl.
CPC ........ *A62B 35/0068* (2013.01); *E04G 21/328* (2013.01); *E04G 21/3276* (2013.01);
(Continued)

(58) Field of Classification Search
CPC ............ A62B 35/0068; E04G 21/3276; E04G 21/328; E04G 21/3285; E04G 21/3261; F16B 2/10
See application file for complete search history.

(56) References Cited

U.S. PATENT DOCUMENTS 3,880,405 A * 4/1975 Brueske .............. E04G 21/3214
256/59
3,920,221 A * 11/1975 Berry .................. E04G 21/3233
256/59
(Continued)

FOREIGN PATENT DOCUMENTS

DE         60035005    2/2008
GB         2516720     2/2015

*Primary Examiner* — Eret C McNichols
(74) *Attorney, Agent, or Firm* — Loginov & Associates, PLLC; William A. Loginov

(57) ABSTRACT

A safety device for securing a person to a floor panel of a shuttering system. A base element secures a safety post. The base element can be placed on a floor panel of a shuttering system. The safety post has a personal safety element, to which the person can be selectively secured. A securing mechanism has a securing carrier, on which at least one engaging element is arranged, wherein the securing carrier is coupled to the base element. The engaging element can be adjusted into a securing position and a release position, wherein the engaging element can be engaged with the shuttering system in the securing position in order to fix the base element to the floor panel, and wherein the engaging element can be decoupled from the shuttering system in the release position in order to decouple the base element from the floor panel.

14 Claims, 3 Drawing Sheets

(52) U.S. Cl.
CPC ...... *E04G 21/3261* (2013.01); *E04G 21/3285* (2013.01); *F16B 2/10* (2013.01)

(56) References Cited

U.S. PATENT DOCUMENTS

| | | | | |
|---|---|---|---|---|
| 3,938,619 | A * | 2/1976 | Kurabayashi | E04G 21/3233 182/113 |
| 4,037,824 | A * | 7/1977 | Whitmer | A62B 35/0056 256/53 |
| 5,029,670 | A | 7/1991 | Whitmer | |
| 6,036,146 | A * | 3/2000 | Paterson | A62B 35/0056 182/113 |
| 6,038,829 | A * | 3/2000 | Franks | E04G 3/26 52/645 |
| 6,173,809 | B1 | 1/2001 | Cole | |
| 6,439,344 | B1 * | 8/2002 | Cole | A62B 35/0068 182/113 |
| 6,722,470 | B2 * | 4/2004 | Carson | A62B 35/0056 182/113 |
| 6,763,910 | B2 * | 7/2004 | Cole | A62B 35/0056 182/113 |
| 6,962,234 | B1 | 11/2005 | Reeves | |
| 7,048,090 | B2 * | 5/2006 | Dean | A62B 35/0056 182/3 |
| 9,187,914 | B2 | 11/2015 | Lallier | |
| 9,216,307 | B2 * | 12/2015 | Liu | E04G 21/3276 |
| 10,022,572 | B2 * | 7/2018 | Wolter | A62B 35/0068 |
| 10,072,689 | B2 * | 9/2018 | Parker | F16B 9/058 |
| 10,763,649 | B2 * | 9/2020 | Dir | H02G 1/08 |
| 2006/0272891 | A1 * | 12/2006 | Casebolt | E04G 5/045 182/36 |
| 2013/0167470 | A1 | 7/2013 | Montgomery | |
| 2019/0234076 | A1 * | 8/2019 | Lallier | E04D 15/00 |
| 2019/0240515 | A1 * | 8/2019 | Saygivar | A62B 35/04 |
| 2019/0366134 | A1 * | 12/2019 | Smith | E04G 21/328 |
| 2020/0284054 | A1 * | 9/2020 | Saygivar | E04G 21/3276 |

* cited by examiner

SAFETY POST

TECHNICAL FIELD

The present invention relates to a safety device for securing a person to a floor panel of a shuttering system. The present invention further relates to a shuttering system as well as a method for securing a person to a floor panel of a shuttering system having a safety device

BACKGROUND OF THE INVENTION

Shuttering systems are used to produce buildings or other structures in concrete construction. The shuttering systems thus make up the forms into which liquid concrete is poured and can subsequently be cured.

In order to use shuttering systems multiple times, these are constructed modularly or on a building-block principle. For example, shuttering boards or floor panels can be adapted flexibly to different forms in a plug-in system. In particular, a horizontal wall or a floor/ceiling can be poured with concrete using shuttering systems. To do this, floor panels are attached to supports, wherein the floor panels form the surface on which concrete can be poured and hardened in order to form the ceiling, for example, a story ceiling.

In concrete building shells, great heights are obtained, wherein story after story is sequentially poured with concrete. The shuttering system is reassembled on a finished concrete ceiling for the next higher concrete ceiling. The installers for the shuttering system then move around on the floor panel while pouring concrete, in part at very great heights. There is for the installers a very high risk of falling in these areas.

SUMMARY OF THE INVENTION

It is an object of the present invention to create a safety device that can be used flexibly in order to reduce the risk of falling for installers in shuttering construction.

This object is achieved by a safety device for securing a person to a floor panel of a shuttering system and by a method for securing a person to a floor panel of a shuttering system using a safety device according to the independent claims.

According to a first aspect of the present invention, a safety device for securing a person to a floor panel (or ceiling panel) of a shuttering system is described. The safety device has a safety post and a base element that is fixed to the safety post. The base element can be placed on a floor panel of a shuttering system, wherein the safety post has a personal safety device, to which the person can be selectively secured. The safety device further has a securing mechanism that has a securing carrier to which at least one engagement element (for example a securing hook) is arranged. The securing carrier is coupled to, for example, the base element, wherein the engagement element can be adjusted into a securing position and a release position. The engaging element in the securing position can be engaged with the shuttering system in order to fix the base element to the floor panel. The engaging element can be decoupled from the shuttering system in the release position in order to decouple the base element from the floor panel.

A shuttering system according to an additional aspect of the present invention is described. The shuttering system has a floor panel, a support device to which the floor panel can be secured, and a safety device described above for securing a person to the floor panel. The base element is placed on the floor panel, wherein the engaging element is engaged with the shuttering system in the securing position, specifically with the support device, in order to fix the safety post to the floor panel.

According to an additional aspect of the present invention, a method for securing a person to a floor panel of a shuttering system having the aforementioned safety device is described. According to the method, the base element is placed on the floor panel. The engaging element in the securing position is adjusted by engaging the engaging element with the shuttering system in order to fix the base panel to the floor panel. The engaging element in the release position is adjusted by decoupling the engaging element from the shuttering system in order to release the base panel from the floor panel.

The shuttering system is used to create a form for pouring concrete walls and, in particular, concrete ceilings. The shuttering system as a ceiling shuttering system here specifically has a support device to which floor panels can be attached. The support device is thus designed in such a manner that this can be quickly and easily assembled and dismantled and can also be adapted to different surface shapes. For example, the shuttering system is made of a support device that also has, for example, crossbeams on which the floor panels (or ceiling panels can be placed. The crossbeams are held at a desired height via floor supports (or ceiling supports). Support profiles can be arranged between the floor panels on the supports. The supports are distributed with each having a defined grid dimension. The support profiles have, for example, so-called bracket heads or support heads in which crossmembers (crossbeams) are placed, upon which, in turn, the floor panels (plates, shuttering elements) can be placed. The support profiles are thus specifically designed in such a manner that the engaging element engages or hooks into the safety device. The support profile is thus specifically a hollow profile (box-shaped hollow profile), a T-profile, a double-T-profile and/or a U-profile.

The installer can move around on the floor panel. The floor panels simultaneously serve as part of the form for the concrete. After the concrete cures, the floor panels can be dismantled in a simple manner.

For securing the installers during the mounting of the floor panels, the safety device is releasably fixed at the desired point of the shuttering device in order to thus protect the installer from a fall from the shuttering system.

The safety device has a safety post and a base element. The safety post is fixed to the base element. The base element is placed on the floor panel. The base element is secured to the shuttering system via the securing mechanism so that the safety post is prevented from tipping over. The safety post extends from the base element in particular in a vertical direction if the base element is placed on the floor panel.

The safety post further has a personal safety element, to which the person can be selectively and releasably secured. The personal safety element is, for example, a loop or hook at which the installer can be secured directly or via a safety device to the safety post. The personal safety element can further be described as a shock-absorber connecting means having a specified fixed length. The personal safety element can also have a length-adjustable fall arrester or a rope shortener. The personal safety element is preferably a fall safety protection device whose extension length can be individually limited. A connecting means that secures the person to the safety post is automatically reeled up and held tight. The personal safety element is specifically arranged in a rotatable manner on the safety post.

The personal safety element has, for example, a longitudinal extension direction about which the personal safety element is rotatably arranged. The person that is connected using the personal safety element can thus move around the post, wherein the personal safety element co-rotates. The safety post has, for example, a length of from 1 to 2 meters (specifically between securing surface and personal safety element). In particular, the personal safety post can also have a length of between 20 centimeters and 2.5 meters. In an exemplary embodiment, the safety post can be extended in a telescoping manner so that the safety post can be adjusted to any length.

The safety post can further be designed as an impact shock absorber. The safety post can have, for example, a rubber shock absorber in order to damp impacts. Furthermore, the safety post can be produced from an elastic material, such as hard rubber. The safety post can also be designed as specifically plastically deformable, so that an impact is damped because of a plastic deformation of the safety post.

The safety post can further be produced from a lightweight material such as aluminum or fiber composite materials, so that simple usability is ensured.

The base element can have, for example, supports that are designed as, for example, a tripod or the like. The base element can further be designed as a round or square plate in order to ensure sufficient standing stability. In other words, the base element can be designed as a pressure plate in order to absorb a homogeneous distribution of pressure and absorb a moment in the event of a fall by an installer.

The securing mechanism is fixed in particular to the base element. The securing carrier of the securing mechanism has the engagement element that is engaged with and specifically hooked into the shuttering system at the support profile described above. The engagement element can form, for example, a toggle fastener or an expansion anchor and can be engaged, for example, in corresponding openings of the floor panel. The engagement element as a securing hook can, for example, be rotationally pivoted or translationally displaced relative to the securing carrier in order to be adjusted between the securing position and the release position.

The engaging element in the securing position is engaged with the shuttering system in such a manner that a secure positive and non-positive anchoring of the base element on the floor panel is generated. In particular, a gap is provided between two adjacent floor panels through which the engaging element can protrude in order to hook into or engage with a support profile present under the floor panel.

The engagement element is further movable, in particular into the release position in which the engaging element releases the positive and non-positive connection to the support profile, so that the safety device can be displaced to a different desired place.

Using the safety device according to the invention, a safety device is created that is easy to use and quick to install during the installation of a shuttering system, in particular a ceiling shuttering system, and during the pouring of the shuttering system with concrete. After the installer has secured the safety post in a position and moved the surrounding floor panels, he can adjust the engaging element into the release position in a simple manner and quickly and easily secure the safety device in a new mounting place by shifting the engaging element into the securing position.

Using the safety device according to the invention, a positioning can be carried out in accordance with the progress of the work. In addition, a plurality of safety devices can also be placed on corresponding floor panels of the shuttering system. In addition, a plurality of safety devices can be equipped with a horizontal tension cable as a stop point so that the tension cable, for example, forms the personal safety element to which the person can secure him/herself. The safety device according to the invention is mounted at the beginning of the work, relocated during the progress of the work and removed in a simple manner after the end of the work.

According to an additional exemplary embodiment, the engaging element is pivotably mounted about a first axis of rotation on the securing carrier. The engaging element can thus pivot between the securing position and the release position.

According to an additional exemplary embodiment, the base element has a support surface for placement on the floor panel and a securing surface opposite the support surface to which the safety post is secured. The securing carrier is arranged on the support surface.

The support surface is located on a support plane that is designed parallel to a surface plane of the floor panel. The securing surface is configured opposite the support surface. The securing surface is located in an attachment plane that is designed parallel to the support surface and is correspondingly distanced from it.

The first axis of rotation is designed in particular in such a manner that is it orthogonal to a normal of the support plane. By means of this, the engaging element thus turns out of or into the support plane. The securing carrier that is arranged on the support surface projects out from the support surface in the opposite direction to the securing surface. In this manner, if the support surface rests upon the securing panel, the securing carrier projects through at the edge of a panel so that the engaging element can engage into a support profile of the support device arranged under the floor panel of the shuttering system.

According to an additional exemplary embodiment, the securing mechanism further has a coupling lever that is rotatably mounted on the safety post about a second axis of rotation and is rotatably mounted on the securing hook about a third axis of rotation, which is configured at a distance from the first axis of rotation, in such a manner that it can be turned by turning the coupling lever about the second axis of rotation of the engaging element.

The coupling lever is in particular rotatably mounted on the safety post or the base element and runs along the securing surface. The engaging element has a coupling area that runs from the securing carrier through the base element and projects from the securing surface. The coupling lever is coupled to this coupling area rotatably about a third axis of rotation.

A pivoting of the securing hook can thus be controlled by an induced pivoting of the coupling lever because the third axis of rotation is arranged at a distance from the first axis of rotation about which the engaging element rotates relative to the securing carrier.

The third axis of rotation is in particular parallel to the first axis of rotation and is arranged at a specific radius or distance from it.

The coupling lever or the securing lever can be activated in a purely mechanical manner, for example by means of a cable system or a tie rod, as explained below. Alternatively, a hydraulic, pneumatic or electrical drive motor can also be used.

According to an additional exemplary embodiment, the securing mechanism further has a tensioning element for activating the coupling lever. The tensioning element extends, for example, from the coupling lever along the safety post. This allows the engaging element to be operated at an operating position which is at a distance from the coupling lever and thus from the base element. It is therefore not necessary for the installer in a bent position to move the engaging element between the release position and the securing position. This ensures an ergonomically advantageous safety device that can be conveniently operated.

Alternatively, the tensioning element can also be attached directly to the securing hook.

The tensioning element can, for example, be produced as a draw cord comprising natural fibers or metal. In an additional exemplary embodiment, the tensioning element has a control rod that is coupled to the coupling lever in such a manner that the engaging element can be moved between the securing position and the release position by controlling the coupling lever.

By use of the control rod, a bidirectional force transfer can be implemented. The control rod can in particular be rotatably arranged about an additional axis of rotation, wherein the additional axis of rotation is designed at a distance from the third axis of rotation and the second axis of rotation.

According to an additional exemplary embodiment, the securing mechanism has a sliding element that can be displaceably arranged along the safety post in the direction of the base element. The tensioning element is mounted on the sliding element.

The sliding element thus forms, for example, a sleeve that encloses the safety post over all or part of its circumference. For example, a guide rail assembly can also be arranged on the safety post, along which the sliding element can travel. A simple and robust control option is thus created for the safety device because the tensioning element is translatorily guided and cannot be freely moved on the safety post. A safe and simple operation of the safety device is thus ensured.

According to an additional exemplary embodiment, the sliding element has a grip area, in particular a grab handle, for gripping and operating the sliding element.

According to an additional exemplary embodiment, the securing mechanism has a transfer lever that is rotatably mounted on the coupling lever about a fourth axis of rotation and has the third axis of rotation at a distance from the fourth axis of rotation.

The transfer lever forms a kind of intermediate lever between the coupling lever and the securing hook. When the coupling lever is swiveled, the transfer lever is drawn along and subsequently turns the engaging element about the first axis of rotation.

The second axis of rotation, the third axis of rotation and the fourth axis of rotation are arranged on the securing surface. The second axis of rotation, the third axis of rotation and the fourth axis of rotation can further be arranged parallel to each other.

According to an additional exemplary embodiment, the coupling lever, the transfer lever and the engaging element are designed and arranged with respect to each other in such a manner that the second axis of rotation and the third axis of rotation are located on a common connector line and the fourth axis of rotation is on or between the connector line and the securing surface, so that a rotation of the engaging element about the first axis of rotation in the direction of the opening position or release position is blocked. A sort of toggle lever mechanism is thus created and implemented.

If the second axis of rotation, the third axis of rotation and the fourth axis of rotation are located on (or the fourth axis of rotation on or below) a common connector line, wherein the connector line runs in particular orthogonally with respect to the respective axes of rotation, a rotation of the engaging element about the first axis of rotation thus causes a tangential force to act on the third axis of rotation because of the pivoting of the engaging element and to correspondingly run along the connector line. In particular, because the connector line connects the second, third and fourth axes of rotation, the induced tangential force forms a radial force that affects the corresponding axis of rotation without resulting in a tangential force relative to the axes of rotation. In this manner, a pivoting of the coupling lever, of the transfer lever and, correspondingly, of the engaging element is suppressed. If the fourth axis of rotation is located below the connector line, meaning between the securing surface and the connector line, the fourth axis of rotation can thus be displaced only until the fourth axis of rotation touches the securing surface and a further movement, and thus an opening of the engaging element, is blocked.

Insofar as the coupling element is not actively pivoted by the tensioning element, no pivoting of the same can be created starting from the securing hook and in line with the coupling rod and the transfer lever. In this manner, a structural checking member of the engaging element is provided so that it cannot be inadvertently pivoted from the securing position into the release position.

Alternatively, or additionally, securing elements, such as securing clamps, a locking hinge or securing pins can also be used to prevent an undesired pivoting of the elements of the securing mechanism.

According to an additional exemplary embodiment, the securing mechanism has a spring element that is coupled to the engaging element in such a manner that the engaging element is pretensioned in the securing position. If the engaging element is thus in the release position, the spring force of the spring element causes a permanent adjusting force of the engaging element in the direction of the securing position. The risk of an undesired release of the safety device is thus reduced.

According to an additional exemplary embodiment, the securing mechanism has an engagement element (securing hook, e.g.) that is fixed to the securing carrier in such a manner that additional engaging elements can be coupled to the shuttering system, wherein the engaging element is arranged at a distance relative to the additional engagement element in such a manner that, in the case of an adjustment of the engaging element relative to the additional engagement element, a distance can be adjusted between the securing hook and the additional engagement element.

By actuating or pivoting the securing hook of the shuttering system, the shuttering system, and in particular the support profile, can be clamped between the engaging element and the additional engaging element in the securing position. This offers an easily adjustable and safe fixing of the safety device to the shuttering system.

It should be noted that the embodiments described here are only a limited selection of possible variations of embodiments of the invention. Thus, it is possible to combine the features of individual embodiments together in a suitable manner so that, for the person skilled in the art with the embodiment variations that are explicit here, a plurality of different embodiments are to be regarded as obviously disclosed In particular, some embodiments of the invention having device claims and other embodiments of the invention are described with method claims. However, for the person skilled in the art, it will become immediately clear from reading this application that, unless explicitly stated otherwise, in addition to a combination of features that belong to one type of subject matter of the invention, any combination of features associated with different types of subject matter of the invention is also possible.

BRIEF DESCRIPTION OF THE DRAWINGS

In the following, exemplary embodiments are more closely described with reference to the accompanying drawings for further clarification and for better understanding of the present invention. Shown are.

DETAILED DESCRIPTION

Identical or similar components in different figures are provided with the same reference numbers. The illustrations in the figures are schematic.

Figure 1:
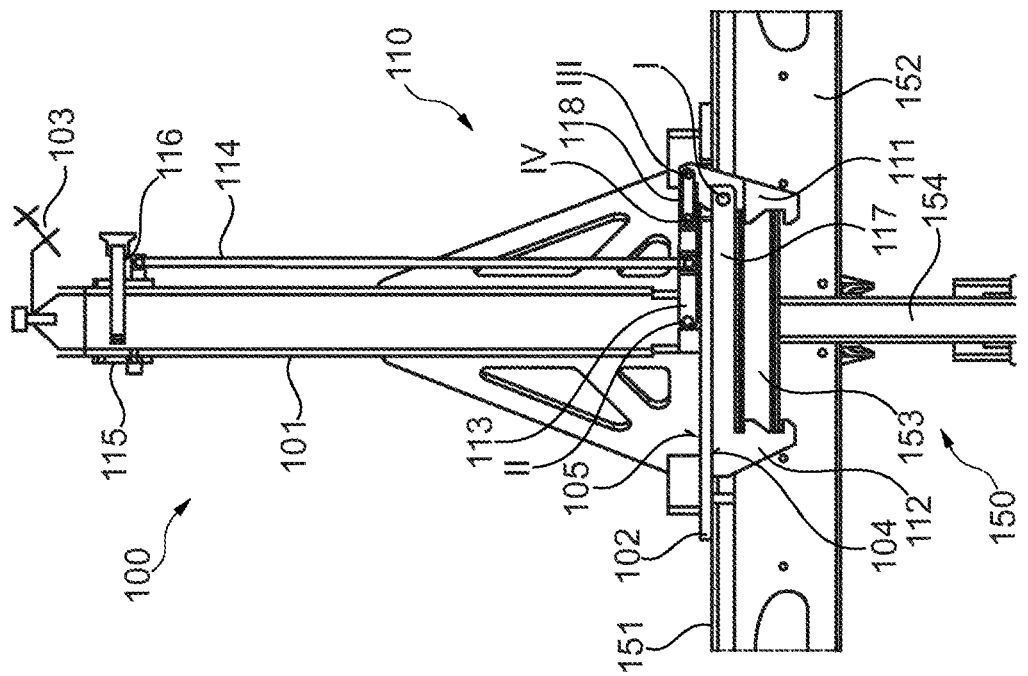
FIG. 1 a schematic illustration of a safety device that in a release position rests on a panel of a shuttering system according to an exemplary embodiment of the present invention, FIG. 2 a schematic illustration of a safety device that in a securing position rests on a panel of a shuttering system according to an exemplary embodiment of the present invention, FIG. 3 an enlarged view of the securing mechanism in release position from FIG. 1, FIG. 4 an enlarged view of the securing mechanism in securing position from FIG. 2, FIG. 5 a perspective representation of the safety device according to an exemplary embodiment of the present invention, and FIG. 6 a perspective representation of the safety device that is arranged on the floor panels of a shuttering system according to an exemplary embodiment of the present invention.
Figure 2:
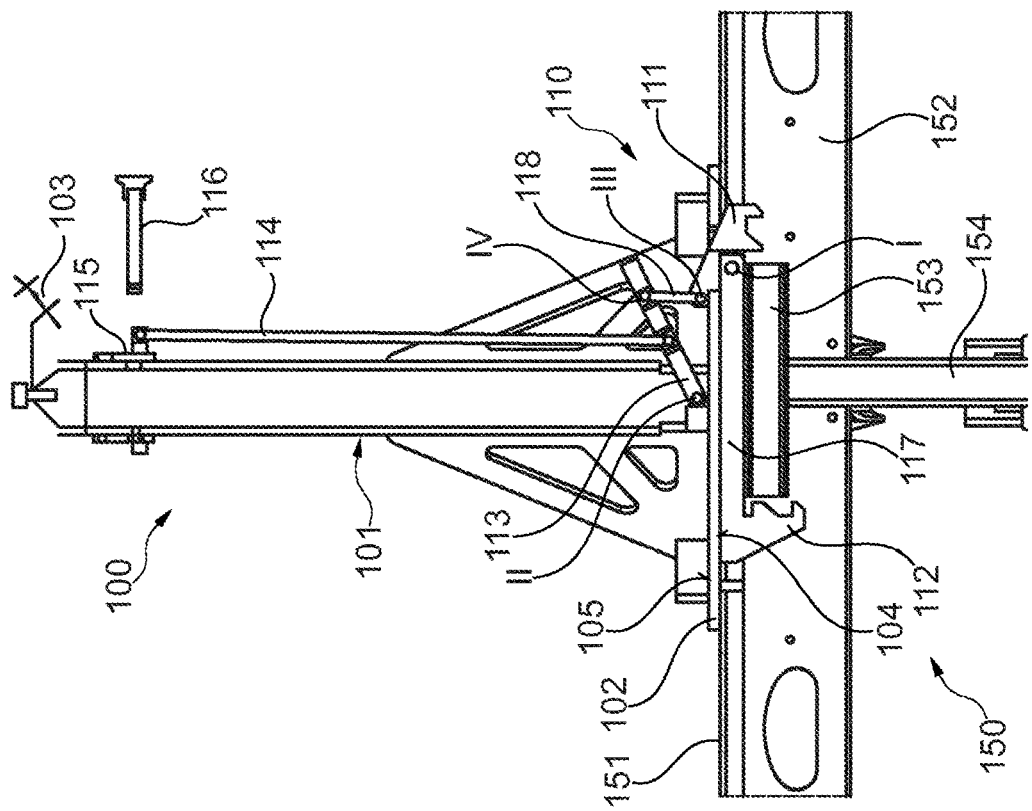

FIG. 1 and FIG. 2 show a schematic illustration of a safety device 100 for securing a person to a floor panel 151 of a shuttering system 150. In FIG. 1, safety device 100 is depicted in a release position and in FIG. 2, safety device 100 is depicted in a securing position.

Safety device 100 has a safety post 101 and a base element 102 that is attached to safety post 101. Base element 102 can be placed on the floor panel or ceiling panel 151 of shuttering system 150. Safety post 101 has a personal safety element 103 to which the person can be selectively secured. Safety device 100 also has a securing mechanism 110 with a securing carrier 117 on which at least one securing hook 111 is arranged. The securing carrier 117 is coupled to base element 102. The engagement element is designed as a securing hook in the exemplary embodiments. Securing hook 111 can be adjusted into a securing position (FIG. 2) and a release position (FIG. 1), wherein securing hook 111 can be engaged in the securing position with shuttering system 150 in order to fix base element 102 on floor panel; 151, and wherein securing hook 111 in the release position can be decoupled from shuttering system 150 in order to decouple base element 102 from floor panel 151.

Shuttering system 150 is used to create a form for pouring concrete walls and in particular concrete ceilings. Shuttering system 150 is described in FIG. 1 and FIG. 2 as a ceiling shuttering system. Shuttering system 150 here specifically has a support device 152 to which floor panels 151 can be attached. Support device 152 is thus designed in such a manner that this can be quickly and easily assembled and dismantled and can also adapt to different surface shapes. For example, shuttering system 150 is made of a support device 152 that, for example, also has crossbeams on which floor panels 151 can be placed. The crossbeams are held at a desired height via floor supports 154. Support profiles 153 are arranged between floor panels 151 on supports 154. Supports 154 are distributed with each having a defined grid dimension.

Safety post 101 is fixed to base element 102. Base element 102 is placed on floor panel 151. Base element 102 is secured to shuttering system 150 by means of securing mechanism 110 so that an overturning of safety post 101 is prevented. Safety post 101 extends from base element 102 in a vertical direction if base element 102 is placed on floor panel 151.

Safety post 101 further has a personal safety element 103, to which the person can be selectively and releasably secured. Personal safety element 103 is, for example, a loop or hook at which the installer can be secured directly or via a safety device to safety post 101. The personal safety element is specifically arranged in a rotatable manner on safety post 101.

Safety post 101, for example, has a longitudinal extension direction about which personal safety element 103 is rotatably arranged. Thus, the person that is connected to personal safety element 103 can move around post 101, wherein personal safety element 103 co-rotates. Safety post 101 has, for example, an extension length from 1 meter to 2 meters.

Securing mechanism 110 is fixed to base element 102. Securing carrier 117 of securing mechanism 110 has securing hook 111 that is engaged with and specifically hooked into shuttering system 150 at the support profile 153 described above. Hook 111 in the present exemplary embodiment can be rotationally pivoted or translationally displaced relative to securing carrier 117 in order to be adjusted between the securing position and the release position.

Securing hook 111 in the securing position is engaged with shuttering system 150 in such a manner that a secure positive and non-positive anchoring of base element 102 on floor panel 151 is generated. In particular, a gap is provided between two adjacent floor panels 151 through which securing hook 111 can protrude in order to hook into or engage with a support profile 153 present under floor panel 151.

Securing hook 111 can additionally be moved in particular into the release position, in which securing hook 111 releases the positive and non-positive connection to support profile 153 (see FIG. 1), so that safety device 100 can be displaced to a different desired place.

Securing hook 111 is pivotably mounted about a first axis of rotation (I) on securing carrier 117. Securing hook 111 can thus pivot between the securing position and the release position.

Base element 102 has a support surface 104 for resting on floor panel 151 and a securing surface 105 opposite support surface 104 to which safety post 101 is attached. Securing carrier 117 is arranged on support surface 104.

Support surface 104 is located in a support plane that is designed parallel to a surface plane of floor panel 151. Securing surface 105 is configured opposite support surface 104. Securing surface 105 is located in an attachment plane that is designed parallel to support surface 104 and is correspondingly distanced from it.

Securing carrier 117, which is arranged on support surface 104, projects out from support surface 104 in the opposite direction from securing surface 105. Therefore, if the support surface lies atop securing panel 151, securing carrier 117 projects through at the edge of a panel 151, so that securing hook 111 can engage with a support profile 153 of support device 152 of shuttering system 150 arranged under floor panel 151.

Securing mechanism 110 further has a coupling lever 113 that is rotatably mounted on safety post 101 about a second axis of rotation II and is rotatably mounted on engaging hook 111 about a third axis of rotation III that is configured at a distance from first axis of rotation I in such a manner that it can be rotated by turning coupling lever 113 about the second axis of rotation II of engaging hook 111.

Coupling lever 113 is in particular rotatably mounted on safety post 101 or base element 102 and runs along securing surface 105. Securing hook 111 has a coupling area that runs from securing carrier 117 through base element 102 and projects from securing surface 105. Coupling lever 113 or transfer lever 118 is rotatably coupled onto this coupling area about a third axis of rotation III.

A pivoting of securing hook 111 can thus be controlled via an induced pivoting of the coupling lever because third axis of rotation III is arranged at a distance from first axis of rotation I about which securing hook 111 rotates relative to securing carrier 117.

Third axis of rotation III is in particular parallel to first axis of rotation I and is arranged at a specific radius or distance from it.

Coupling lever 113 is mechanically actuated via a tension element 114 or a tie rod 114. Tie rod 114 extends, for example, from coupling lever 113 along safety post 101. This allows securing hook 111 to be operated at an operating position which is at a distance from coupling lever 113 and thus from base element 102. It is therefore not necessary for the installer to move the securing hook 111 between the release position and the securing position in a bent position. This ensures an ergonomically advantageous safety device that can be conveniently operated.

By use of the control rod 114, a bidirectional force transfer can be implemented. Control rod 114 can in particular be rotatably arranged about an additional axis of rotation on coupling lever 113, wherein the additional axis of rotation is designed at a distance from third axis of rotation III and second axis of rotation II.

Securing mechanism 110 also has a sliding element 115 that is arranged in such a manner that it can be displaced along safety post 101 in the direction of base element 102. Control rod 114 is attached to sliding element 115.

Sliding element 115 thus forms, for example, a sleeve that encloses safety post 101 over all or part of its circumference. A simple and robust control option is thus created for safety device 100 because tensioning element 114 is translatorily guided and cannot be freely moved on safety post 101. The sleeve has, for example, a bore through which a safety bolt 116 can be inserted transverse to the direction of movement of the sleeve along safety post 101 in order to secure the sleeve or sliding element 115 against undesired displacement. A release or actuation of sliding element 115 thus requires two different movement sequences: a) the removal of safety bolt 116 and b) the displacement of sliding element 115 along safety post 101. This increases the security against an undesired actuation of sliding element 115. Securing bolt 116 can further be secured by means of a locking system (e.g. with a padlock) in order to prevent an undesired release of securing bolt 116.

Securing mechanism 110 has an additional securing hook 112 that is fixed to securing carrier 117 in such a manner that additional securing hook 112 can be coupled to shuttering system 150, wherein securing hook 111 is arranged at a distance relative to additional securing hook 112 in such a manner that a distance between securing hook 111 and additional securing hook 112 can be adjusted by a pivoting of securing hook 111 relative to additional securing hook 112. In this manner, by pivoting securing hook 111, shuttering system 150, and in particular support profile 153, are clamped between securing hook 111 and additional securing hook 112 in the securing position. This offers an easily adjustable and safe fixing of safety device 100 to shuttering system 150.

Figure 3:
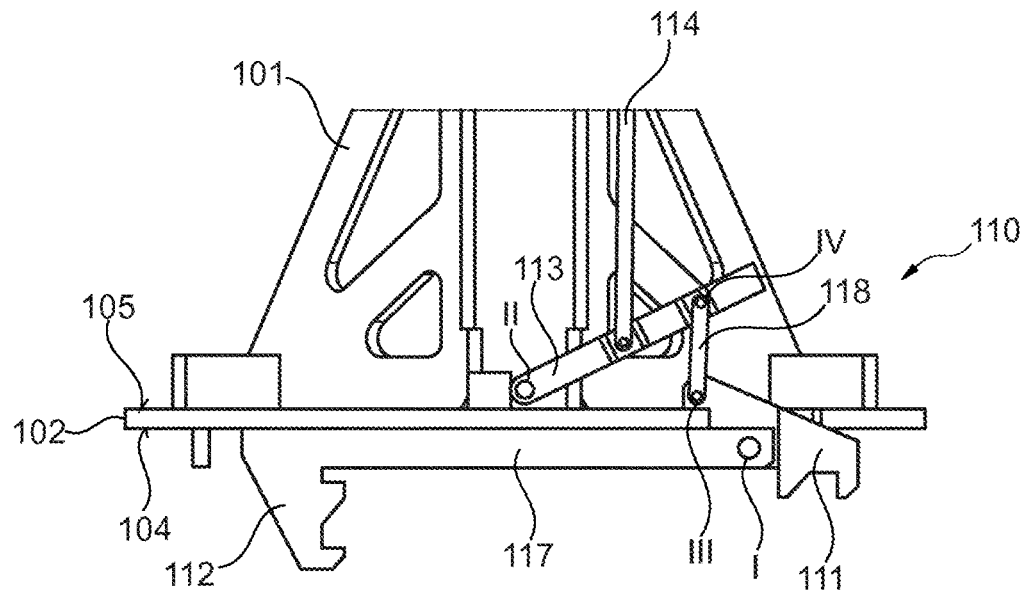
Figure 4:
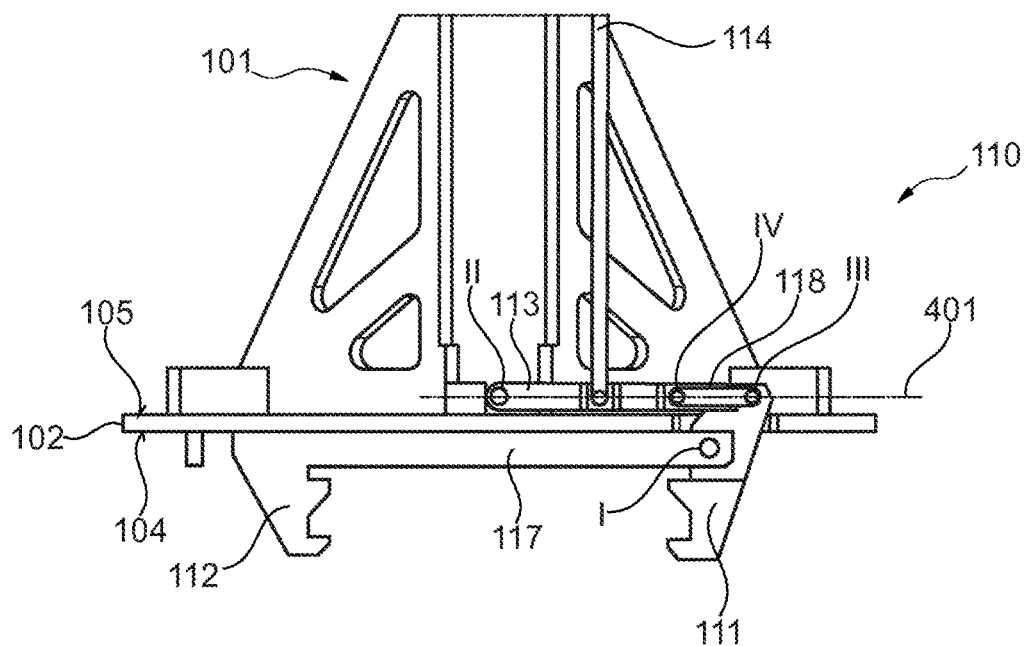

FIG. 3 shows an enlarged view of securing mechanism 110 in release position from FIG. 1 and FIG. 4 shows an enlarged view of securing mechanism 110 in securing position from FIG. 2. The preferred embodiments of securing mechanism 110 having securing hook 111, coupling lever 113 and transfer lever 118 are more precisely described below.

Transfer lever 118 is rotatably mounted on coupling lever 113 about a fourth axis of rotation IV and has third axis of rotation III at a distance from fourth axis of rotation IV. Transfer lever 118 forms a kind of intermediate lever between coupling lever 113 and securing hook 111.

During pivoting of coupling lever 113, transfer lever 118 is pulled along and then securing hook 111 rotates about first axis of rotation I. Second axis of rotation II, third axis of rotation III and fourth axis of rotation IV are in particular arranged at a distance from securing surface 105. Second axis of rotation II, third axis of rotation III and fourth axis of rotation IV are further arranged parallel to each other.

Coupling lever 113, transfer lever 118 and the securing hook are designed and arranged with respect to each other in such a manner that second axis of rotation II and third axis of rotation III are located on a common connector line 401 (and fourth axis of rotation IV is located below connector line 401, meaning between the connector line and securing surface 105), so that a rotation of securing hook (111) about first axis of rotation I (under action of a force on the securing hook 111 in the opening direction) is blocked. If second axis of rotation II, third axis of rotation III and fourth axis of rotation IV are located on a common connector line 401, wherein connector line 401 runs specifically orthogonally with respect to the respective axes of rotation II, III, IV, a rotation of the securing hook 111 about first axis of rotation I thus causes a tangential force on third axis of rotation III because of the pivoting of securing hook 111 and correspondingly runs along connector line 401. In particular, because connector line 401 connects second, third and fourth axes of rotation II, III, IV, the induced tangential force forms a radial force that affects the corresponding axis of rotation without resulting in a tangential force relative to the axes of rotation. In this manner, a pivoting of coupling lever 113, of transfer lever 118 and, correspondingly, of securing hook 111 is suppressed.

Insofar as coupling element 113 is not actively pivoted by tensioning element 114, no pivoting of the same can be created starting from securing hook 111 and in line with coupling rod 114 and transfer lever 118. In this manner, a structural checking member of securing hook 111 is provided so that it cannot be inadvertently pivoted from the securing position into the release position.

Figure 5:
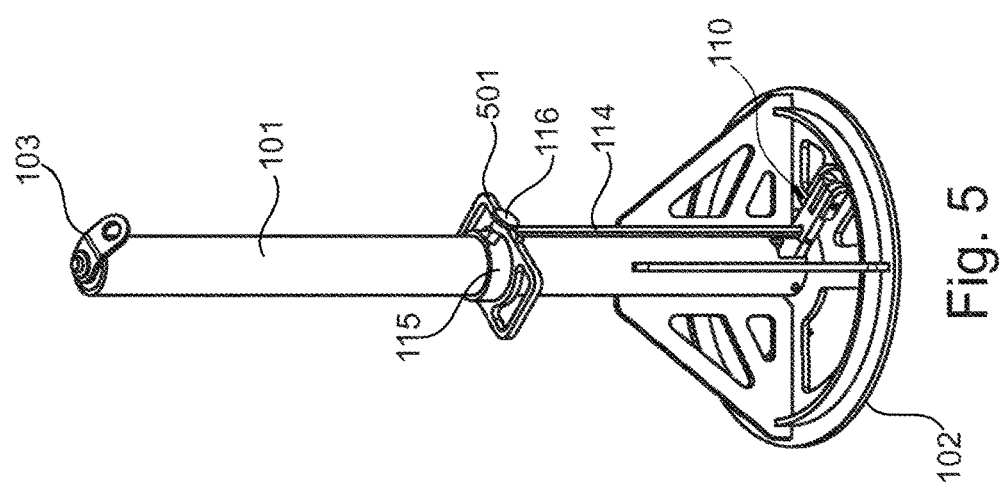

FIG. 5 shows a perspective representation of safety device 100 from FIG. 1 to FIG. 4. Base element 102 can further be designed as a round or square plate in order to ensure sufficient standing stability. In other words, base element 102 can be designed as a pressure plate in order to absorb a homogeneous distribution of pressure and hold a momentum in the case of a fall by an installer.

Sliding element 115 has a grip area 501, specifically a grab handle, for grasping and operating the sliding element 115.

Figure 6:
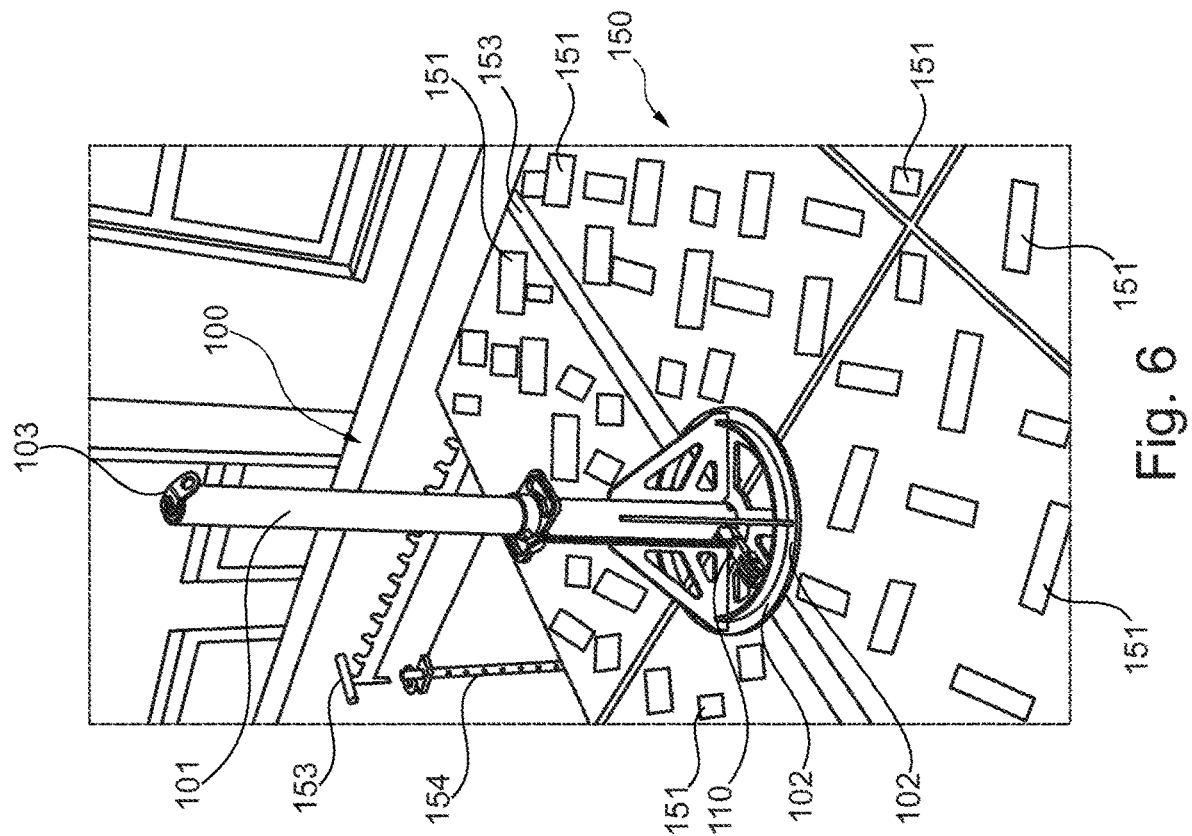

FIG. 6 shows a perspective representation of safety device 100 that is arranged on floor panels 151 of a shuttering system 150. The support profiles 153 have so-called console heads into which crossmembers (transverse struts) are inserted, on which, in turn floor panels 151 are placed. Support profiles 153 are thus specifically designed in such a manner that securing hook 111 engages or hooks into safety device 100. The support profile is, for example, a square hollow profile. In particular, a gap is provided between two adjacent floor panels 151 through which securing hook 111 can protrude in order to hook into or engage with a support profile 153 present under floor panel 151.

The installer can travel on floor panel 151. Floor panels 151 simultaneously serve as part of the form for the concrete. After the concrete cures, floor panels 151 can be dismantled in a simple manner.

For securing the installers during the mounting of floor panels 151, safety device 100 is releasably fixed at the desired point of shuttering device 150 in order to thus protect the installer from a fall from the shuttering system 150.

Additionally, it should be noted that terms such as "comprising," and the like do not preclude other elements or steps, and terms such as "a" or "one" do not preclude a plurality. Furthermore, it should be noted that features or steps that have been described with reference to one of the above embodiments may also be used in combination with other features or steps of other embodiments described above. Reference characters in the claims are not to be interpreted as being limiting.

LIST OF REFERENCE CHARACTERS

100 Safety device
101 Safety post
102 Base element
103 Personal safety element
104 Support surface
105 Securing surface
110 Securing mechanism
111 Engaging element, securing hook
112 Additional securing hook
113 Coupling lever
114 Tension element/control rod
115 Sliding element
116 Securing bolt
117 Securing carrier
118 Transfer lever
150 Shuttering system
151 Floor panel
152 Support device
153 Support profile
154 Support
401 Connector line
501 Grip area
I First axis of rotation
II Second axis of rotation
III Third axis of rotation
IV Fourth axis of rotation

The invention claimed is:

1. A safety device for securing a person to a floor panel of a shuttering system, the safety device having:
a safety post,
a base element that is attached to the safety post, wherein the base element is configured to be placed on the floor panel of the shuttering system, wherein the safety post has a personal safety element, to which the person can be selectively secured, and
a securing mechanism that has a securing carrier, on which at least one engaging element is arranged, wherein the securing carrier is coupled to the base element, wherein the engaging element is configured to be adjusted into a securing position and a release position, wherein the engaging element in the securing position can be engaged with the shuttering system in order to fix the base element to the floor panel, and wherein the engaging element is configured to be decoupled from the shuttering system in the release position in order to decouple the base element from the floor panel, wherein the engaging element is pivotably mounted about a first axis of rotation (I) on the securing carrier,
wherein the securing mechanism further has a coupling lever that is rotatably mounted on the safety post about a second axis of rotation and is rotatably mounted on the engaging element about a third axis of rotation (III), which is configured at a distance from the first axis of rotation (I), such that the securing mechanism can be rotated by turning the coupling lever about the second axis of rotation (II) of the engaging element.

2. The safety device according to claim 1, wherein the base element has a support surface for resting on the floor panel and a securing surface opposite the support surface, on which the safety post is mounted,
wherein the securing carrier is arranged on the support surface.

3. The safety device according to claim 1, wherein the securing mechanism further has a tension element for activating the coupling lever.

4. The safety device according to claim 3, wherein the tension element has a control rod that is coupled to the coupling lever such that the engaging element is movable between the securing position and the release position by controlling the coupling lever.

5. The safety device according to claim 3, wherein the securing mechanism has a sliding element that is arranged such that the sliding element is displaceable along the safety post in the direction of the base element, wherein the tension element is attached to the sliding element.

6. The safety device according to claim 5, wherein the sliding element has a grip area, specifically a grab handle, for grasping and operating the sliding element.

7. The safety device according to claim 6, wherein grip area comprises a grab handle.

8. The safety device according to claim 1,
wherein the securing mechanism has a transfer lever that is rotatably mounted on the coupling lever about a fourth axis of rotation (IV) and has the third axis of rotation (III) at a distance from the fourth axis of rotation (IV).

9. The safety device according to claim 8, wherein the second axis of rotation (II), the third axis of rotation (III) and the fourth axis of rotation are arranged on the securing surface.

10. The safety device according to claim 8, wherein the coupling lever, the transfer lever and the engaging element are arranged with respect to each other such that the second axis of rotation and the third axis of rotation and the fourth axis of rotation are located on a common connector line and the fourth axis of rotation is located on or between the connector line and the securing surface so that a rotation of the engaging element about the first axis of rotation (I) is blocked.

11. The safety device according to claim 1,
wherein the securing mechanism has a spring element that is connected to the engaging element such that the engaging element is pretensioned in the securing position.

12. The safety device according to claim 1, wherein the securing mechanism has an additional engaging element that is fixed on the base element such that the additional engaging element is couplable to the shuttering system, wherein the engaging element is arranged at a distance relative to the additional engaging element such that, during an adjustment of the engaging element relative to the additional engaging element, a distance between the engaging element and the additional engaging element can be set.

13. A shuttering system having a floor panel, a support device, to which the floor panel can be attached, and a safety device for securing a person to a floor panel, the safety device comprising:
a safety post,
a base element that is attached to the safety post, wherein the base element is configured to be placed on the floor panel of the shuttering system, wherein the safety post has a personal safety element, to which the person can be selectively secured, and
a securing mechanism that has a securing carrier, on which at least one engaging element is arranged, wherein the securing carrier is coupled to the base element, wherein the engaging element is configured to be adjusted into a securing position and a release position, wherein the engaging element in the securing position can be engaged with the shuttering system in order to fix the base element to the floor panel, and wherein the engaging element is configured to be decoupled from the shuttering system in the release position in order to decouple the base element from the floor panel,
wherein the base element is placed on the floor panel, wherein the engaging element is engaged with the shuttering system in the securing position with the support device in order to fix the safety post to the floor panel, wherein the engaging element is pivotably mounted about a first axis of rotation (I) on the securing carrier,
wherein the securing mechanism further has a coupling lever that is rotatably mounted on the safety post about a second axis of rotation and is rotatably mounted on the engaging element about a third axis of rotation (III), which is configured at a distance from the first axis of rotation (I), such that the securing mechanism can be rotated by turning the coupling lever about the second axis of rotation (II) of the engaging element.

14. A method for securing a person to a floor panel of a shuttering system using the safety device of claim 1, the method comprising:
placing of a base element on the floor panel, and
adjusting an engaging element into a securing position by engaging the engaging element with the shuttering system to fix a base panel to the floor panel, and
adjusting the engaging element into a release position by decoupling the engaging element from the shuttering system to release the base panel from the floor panel.

* * * * *